United States Patent [19]
Epkens

[11] Patent Number: 5,494,367
[45] Date of Patent: Feb. 27, 1996

[54] HARSH ENVIRONMENT LINE SWIVEL

[76] Inventor: Heiko Epkens, #305, 1928 West 2nd Ave., Vancouver, British Columbia, Canada, Y6I 1J3

[21] Appl. No.: 167,359

[22] Filed: Dec. 16, 1993

Related U.S. Application Data

[63] Continuation-in-part of Ser. No. 163,521, Dec. 9, 1993.
[51] Int. Cl.⁶ ............................................. F16D 1/12
[52] U.S. Cl. .................................... 403/164; 285/351
[58] Field of Search ................................. 403/165, 164, 403/78, 40; 59/95, 9; 285/14, 94, 351

[56] References Cited

U.S. PATENT DOCUMENTS

| | | | |
|---|---|---|---|
| 1,959,823 | 5/1934 | Greve | 403/165 X |
| 2,246,588 | 6/1941 | Harrall | 403/165 X |
| 2,253,932 | 8/1941 | Gilkerson | 403/78 X |
| 2,811,378 | 10/1957 | Kalista | 403/78 X |
| 2,837,177 | 6/1958 | Edge et al. | 188/2 R |
| 3,244,440 | 4/1966 | Ashton et al. | 403/164 X |
| 3,490,799 | 1/1970 | Shreeve | 403/3 |
| 3,844,127 | 10/1974 | Koop, Jr. et al. | 403/165 X |
| 4,552,481 | 11/1985 | Bluett | 403/165 |
| 4,600,331 | 7/1986 | Gray | 403/165 |
| 4,669,907 | 6/1987 | Patton | 403/165 X |
| 4,687,365 | 8/1987 | Promersberger | 403/2 |
| 4,998,551 | 3/1991 | DeSarno | 403/165 X |

FOREIGN PATENT DOCUMENTS

| | | | |
|---|---|---|---|
| 966646 | 10/1950 | France | 403/164 |
| 2344356 | 3/1974 | Germany | 403/164 |

OTHER PUBLICATIONS

"Cable Pulling Systems Tools and Accessories", Canada Coupling Inc., selected excerpts from Catalogue dated Jun., 1992.

*Primary Examiner*—Dave W. Arola
*Assistant Examiner*—Christopher J. Novosad
*Attorney, Agent, or Firm*—Fish & Richardson

[57] ABSTRACT

A harsh environment swivel is disclosed. The swivel is of the type having first and second swivel heads located at opposite ends of a generally hollow swivel body. A swivel shaft is attached to the first swivel head and secured within the hollow body by a locking nut. The swivel shaft rotates about tapered roller bearings which transmit tensile loading from the swivel shaft to the hollow body. A plurality of progressively more restrictive seals restrict the passage of debris into the interior of the hollow body. In a further embodiment, a swivel having independently rotating swivel heads at either end is disclosed. A method of flushing debris from the interior of a swivel is also disclosed.

10 Claims, 3 Drawing Sheets

HARSH ENVIRONMENT LINE SWIVEL

This application is a continuation-in-part of application Ser. No. 08/163,521, filed on Dec. 9, 1993.

FIELD OF INVENTION

This invention relates to swivels for providing a rotatable connection between two cables, between a cable and another object, or between two objects. In particular, the invention pertains to such swivels where they may be subjected to harsh environments, including being exposed to water or dirt.

BACKGROUND OF THE INVENTION

Swivels and their use are well known. Swivels have commonly been used to connect together two lines or cables where rotation at the point of connection is desired. For example, when an electrical or telecommunications cable is being pulled through a conduit by the use of a pulling or fish line, the cable is typically unrolled off a large reel at one end of the conduit as it is pulled through. As the cable unrolls, it sometimes develops twists that, if not corrected, could damage the cable under the tension applied for long pulls. The use of a swivel between the end of the cable and the pulling line enables any such twists to be removed as the cable may rotate independent of the pulling line.

In other applications, a swivel is critical to the operation of combined underground boring and cable pulling. In this situation, a pilot hole is drilled through the underground structure where a cable is to be run. Once the pilot hole is completed, a drill steel is inserted back through the hole and a cutting head attached to the drill steel. The drill steel is then connected to a boring machine which drives the cutter, either through direct rotation or through the application of pneumatic or hydraulic pressure to motors on the cutter. Typically a cable, or in some instances a conduit or casing, is connected to the rear of the cutting head so that pulling the cutting head back through the pilot hole not only enlarges the pilot hole to the desired diameter but also serves to pull the cable or conduit as the hole is cut. Accordingly, since the cutting head is rotating to enlarge the pilot hole, in order to be able to pull a cable or conduit through the hole a swivel must form part of the connection between the cutting head and the cable or conduit.

Yet a further application of such swivels involves use on cables for lifting, such as would be used on cranes or the like. When lifting objects with a crane it is usually desirable or necessary to be able to rotate the lifted object to facilitate movement or re-positioning. In order to prevent the application of rotational forces on the crane's lifting cable, line swivels are often incorporated on the harness or sling used to attach the crane cable to the object.

In each of the above applications, as well as in numerous others, the swivel must be designed to withstand the tensile force applied to it under use and must be able to operate in environments that may subject the swivel to water and dirt. For example, when used in underground boring applications the swivel will be directly subjected to water and dirt and may even be completely submerged in mud or debris at times. Similarly, when pulling cables through underground conduit, one often encounters conduits filled with water or mud. In lifting operations, line swivels are typically exposed to rain, sleet or snow and are often subjected to significant tensile loading.

Others have recognized these design criteria and attempted to develop line swivels capable of operating under such environments, and capable of withstanding the tensile loading to which they may be subjected, but have failed. In order to be able to withstand the load to which the swivel may be exposed, others have commonly increased the size of the components of the swivel, including ball bearing components as are typically used. While this may be one manner of approaching the problem, the result is sometimes a swivel too large in physical dimension for the desired task. In addition increasing the physical size of the swivel increases its weight and normally its cost.

Similarly the methods of sealing swivels against water and debris that have been used or proposed to date have met with limited success. The means of sealing that have been used are only effective under limited exposure in terms of both time and quantity of water and debris to which the swivel may be subjected, and comprise the use of a simple "O" ring seal.

The result of these shortcomings is that swivels currently in use have a significantly reduced operational life span when used in harsh environments. Once water or dirt penetrates into the interior of the swivel, corrosion, freezing in low temperatures, and reduced bearing life usually result. As well, significant tensile loading quickly causes ball bearings to fail or wear prematurely.

Furthermore, in extreme environments, or in operations where the "in-hole" equipment is extensive or costly, the integrity of the swivelling capability required is such that often two swivels are linked together in series. Through the use of two swivels, in the event that one fails the second swivel will be sufficient to complete the operation. Where a single swivel is used and that swivel fails, it is often necessary to abandon the operation resulting in a loss of both time and equipment. Unfortunately, the use of two swivels in series significantly increases the cost and requires the use of connecting links between the swivels which are also costly and subject to failure.

SUMMARY OF THE INVENTION

The invention therefore provides a swivel which overcomes the shortcomings of the prior devices through the incorporation of a structure which is able to withstand both the tensile and rotational forces that may be applied to it and which is able to perform under harsh environment conditions. The invention also provides a swivel which may be equally used in underground boring situations, pulling cable through a conduit, or in vertical lifting operations. In a further embodiment, the invention provides a swivel with two independent swivel heads such that failure of one swivel head will not prevent the continued operation of the other swivel head.

Accordingly, in one of its aspects the invention provides a harsh environment swivel comprising: first and second swivel heads situated at opposite ends of a generally hollow swivel body, said first swivel head in rotational engagement with said hollow body and said second swivel head fixed to said hollow body; a swivel shaft attached to said first swivel head and rotationally received within said hollow body, retaining means securing said swivel shaft within said hollow body; said retaining means permitting rotational movement of said shaft, and hence said first swivel head, relative to said hollow body and said second swivel head; bearing means within said hollow body allowing for reduced frictional rotation of said swivel shaft within said hollow body when said swivel shaft is under tensile loading; and, a plurality of sealing means between said first swivel head, said swivel shaft and said hollow body, said sealing means progressively more restrictive to the passage of particulate and liquid debris from a position exterior to said hollow body to the interior of said hollow body.

In another aspect of the present invention the bearing means includes a first set of tapered roller bearings located on the interior surface of the hollow body and encompassing the swivel shaft wherein the tapered roller bearings are interior to the sealing means.

In a further embodiment, the present invention includes a grease fitting communicating with the interior of the hollow body such that injection of grease through the fitting forces debris within the hollow body back through the sealing means to be expelled from the swivel.

In yet a further embodiment, the invention comprises a harsh environment line swivel comprising first and second swivel heads situated at opposite ends of a swivel body, said first and second swivel heads in rotational engagement with said swivel body; a pair of swivel shafts attached to opposite ends of said swivel body, said swivel shafts being received within said first and said second swivel heads, respectively; retaining means securing said swivel shafts within said swivel heads, said retaining means permitting rotational movement of said swivel heads about said swivel shaft and said swivel body; bearing means for reduced frictional rotation of said swivel heads about said swivel shafts; and a plurality of sealing means between said swivel heads and said swivel body, said sealing means progressively more restrictive to the passage of particulate and liquid debris into said swivel body and said swivel heads.

In still yet a further embodiment the invention comprises a method for flushing debris from the interior of a swivel, having sealing means and bearing means interior to said sealing means, comprising injecting grease into the interior of the swivel in a direction opposite to the direction of entry of debris and away from said bearing means out of the interior of the swivel.

BRIEF DESCRIPTION OF THE DRAWINGS

For a better understanding of the present invention, and to show more clearly how it may be carried into effect, reference will now be made, by way of example, to the accompanying drawings which show the preferred embodiments of the present invention in which.

DESCRIPTION OF THE PREFERRED EMBODIMENT

Figure 1:
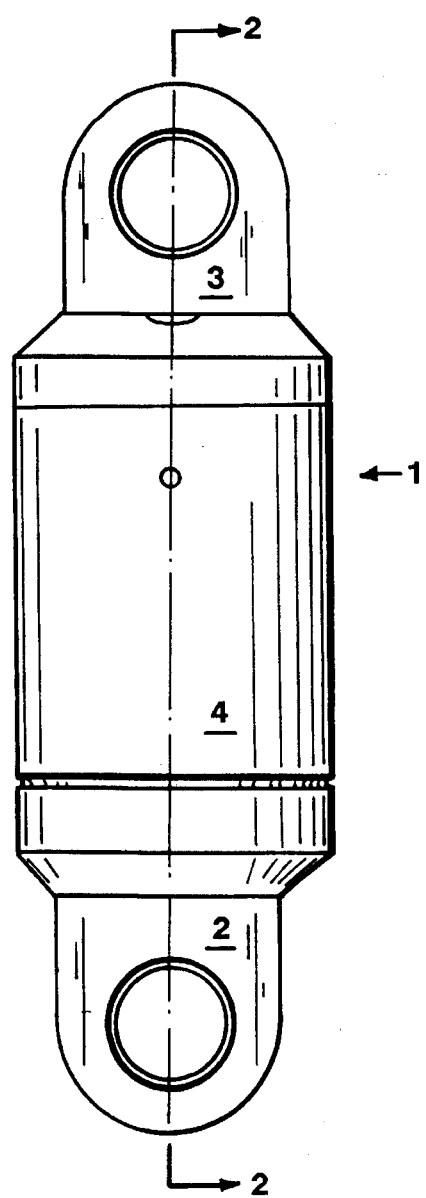
FIG. 1 is a side view of the swivel of the invention.

Referring to FIG. 1, a swivel is shown pursuant to the present invention noted generally by the numeral 1. The swivel 1 generally comprises first and second swivel heads, 2 and 3 respectively, and a swivel body 4.

Figure 2:
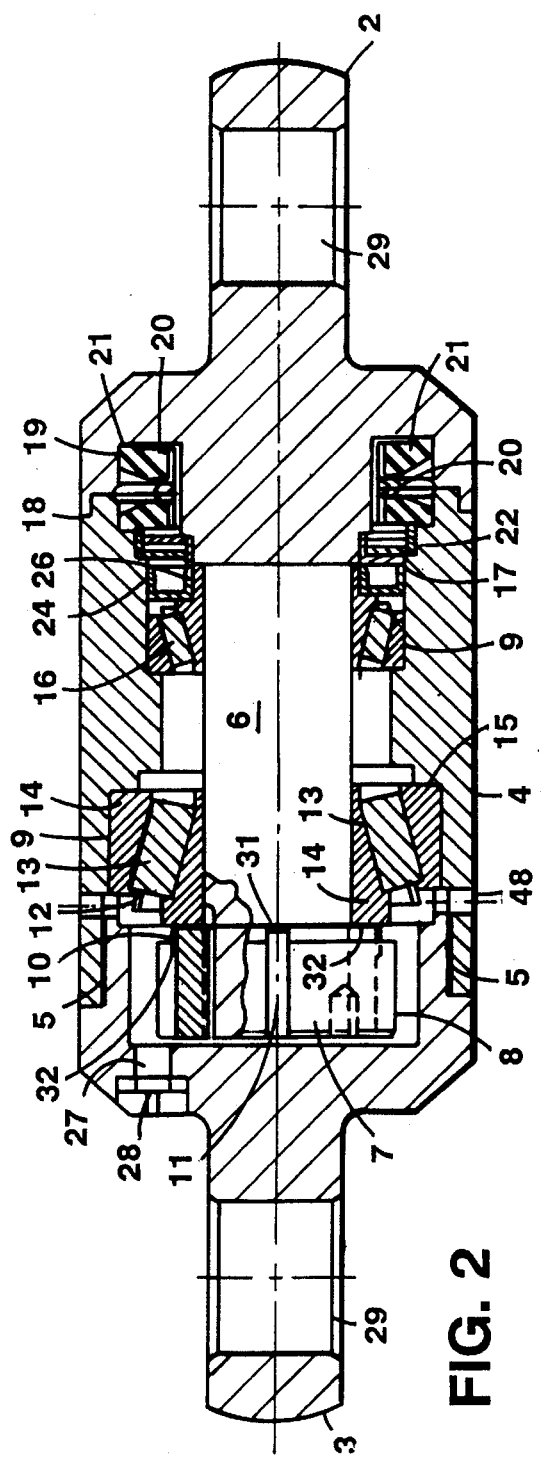
FIG. 2 is a sectional view of the swivel of the present invention taken along the line 2—2 in FIG. 1.

As is more clearly shown in FIG. 2, swivel body 4 is generally hollow in nature. In the preferred embodiment second swivel head 3 is fixed to hollow body 4 while first swivel head 2 is able to freely rotate about hollow body 4. Preferably hollow body 4 and second swivel head 3 are fitted with threads (generally noted at 5) such that swivel head 3 can be screwed onto hollow body 4 and tightened in place. In order to prevent these parts from vibrating loose during use, a set screw 48, located in hollow body 4 at the point of threaded engagement with second swivel head 3, is tightened against the threads of swivel head 3.

The amount of overlap of hollow body 4 and second swivel head 3 at their point of contact is sufficient to ensure adequate strength of the connection and also sufficient to prevent the entry of liquid or debris into the interior of hollow body 4 along threads 5. However, in order to increase the sealing effect of threads 5 even more, a suitable threading compound may be applied to threads 5 before second swivel head 3 is threaded onto hollow body 4.

As is also shown in FIG. 2, attached to first swivel head 2 is a swivel shaft 6 which is received within hollow body 4. Typically swivel shaft 6 would be merely an extension of first swivel head 2, both being of unitary construction. However, it will be appreciated by those skilled in the art that swivel shaft 6 may also be threaded or attached by other means to first swivel head 2. Swivel shaft 6 is secured within hollow body 4 by retaining means 7. Retaining means 7 generally comprises a locking nut 8 which is threaded onto the end of swivel shaft 6 and tightened against bearing means 9 thereby securing swivel shaft 6 firmly in place.

The tensile force to which swivel 1 is subjected will be born by locking nut 8. Accordingly it is critical that locking nut 8 not loosen or fall off under use, particularly in light of the fact that swivel shaft 6, and hence locking nut 8, will be under the influence of rotational force when in use. For this reason, a lock washer 10 is situated between locking nut 8 and bearing means 9. To ensure that lock washer 10 itself does not rotate during operation, its inside diameter is fitted with a clip 31 which is received in one of a series of keyways 11 on locking nut 8. Furthermore, lock washer 10 has numerous tabs 32 extending radially outward from its outer diameter. During assembly of the swivel, some of the tabs 32 will be bent so as to engage keyways 11 in locking nut 8, while others will be left to increase the frictional contact between lock washer 10 and swivel shaft 6 as is the situation when using a typical lock washer. Thus clip 31 serves to assist in preventing lock washer 10 from rotating while tabs 32 prevent the locking nut 8 from becoming loosened. In addition, in the preferred embodiment a key (not shown) may be inserted into one of the keyways 11, and into corresponding keyways (not shown) on shaft 6, to prevent locking nut 8 from being loosened during operation.

As mentioned, locking nut 8 is tightened against bearing means 9 to hold swivel shaft 6 in place. Bearing means 9 serves to permit swivel shaft 6 to rotate within hollow body 4 under reduced friction. It will be appreciated by those skilled in the art that when in use swivel 1 will experience rotational as well as tensile forces. Prior devices have been concerned primarily with the rotational forces developed within the swivel and have utilized various types of ball bearings to reduce rotational friction. Such bearings do not, however, address the tensile forces applied to the swivel.

In the present invention the applicant has found that utilizing tapered roller bearings within hollow body 4 serves the dual function of reducing friction resulting from both the rotational movement of swivel shaft 6 and from tensile loading. As can be seen in FIG. 2, tapered roller bearings 12, comprising bearing elements 13 and a casing 14, are located within hollow body 4, and encompass swivel shaft 6. Bearing elements 13 are rollers that are able to withstand significantly more force than mere ball bearings. Furthermore, it will be understood that the slight taper of the bearings 13 (with the larger end closest to locking nut 8) increases the ability of the swivel to accommodate the substantial tensile or axial loading to which it will be subjected.

The casing 14 of tapered roller bearings 12 bears against shoulder 15 of hollow body 4. FIG. 2 also shows that lock washer 10 and locking nut 8 bear against the opposite end of casing 14 such that the tensile loading of swivel shaft 6 is transferred through roller bearings 12 to hollow body 4. I can now be appreciated that the function of locking nut 8 is to both hold swivel shaft 6 within hollow body 4 and to allow for roller bearings 12 to be loaded into hollow body 4 and be held firmly in place through torquing locking nut 8. As discussed above, tabs 32 of lock washer 10 can then be bent over to be received within one of keyways 11 to prevent rotation of locking nut 8.

In order to stabilize swivel shaft 6 within hollow body 4, the preferred embodiment includes a further second set of tapered roller bearings 16 situated at a distance from the first set of tapered roller bearings 12. Second set of tapered roller bearings 16 are substantially the same as roller bearings 12 with the exception that they may be smaller since they do not act as thrust bearings and do not bear the tensile force exerted on swivel shaft 6.

As with generally all forms of bearings, it is important that the tapered roller bearings 12 and 16 remain free from the effects of moisture and debris which can reduce their effectiveness and operating life. Accordingly the present invention incorporates the use of a plurality of sealing means 17 between first swivel head 2, swivel shaft 6 and hollow body 4. Sealing means 17 are designed such that they progressively restrict the passage of liquid or debris into the interior of hollow body 4. As will be seen from FIG. 2, tapered roller bearings 12 and 16 are interior to sealing means 17 to protect them from moisture or debris that may enter the swivel.

In the preferred embodiment, sealing means 17 comprises a series of four separate and distinct seals. The first seal is a gap seal, represented in FIG. 2 by the numeral 18. Gap seal 18 is formed through the overlapping of first swivel head 2 and the outer surface of hollow body 4. When locking nut 8 is tightened onto the end of swivel shaft 6, first swivel head 2 is brought into close proximity to hollow body 4 such that the space between the two components, and the overlapping of them, creates a fine gap which excludes dirt particles of a larger diameter. In addition, since first swivel head 2 overlaps hollow body 4, as opposed to hollow body 4 overlapping first swivel head 2, water is less likely to enter through gap seal 18 when swivel 1 is pulled in the direction of first swivel head 1.

Sealing means 17 also includes a second seal 19 situated between said first swivel head and said hollow body 4. Second seal 19 is interior to gap seal 18 such that it operates as a secondary sealing means to restrict passage of debris that passes through gap seal 18. In the preferred embodiment, second seal 19 comprises a pair of contacting ring members 20 which bear against one another providing a sealing effect. One of each of the contacting ring members 20 is attached to first swivel head 2 and hollow body 4 through webs 21. Webs 21 cause ring members 20 to be held together tightly to increasing their sealing effect. Since ring members 20 are attached to first swivel head 2 and hollow body 4, they are able to rotate relative to each other with the rotation of first swivel head 2. An example of a commercially available seal which may be used as second seal 19 is the CR HDDF #18259 seal.

FIG. 2 shows third sealing means 22, located interior to second sealing means 19. Third sealing means 22 restricts the passage of debris that may pass through second sealing means 19 and acts as yet a further progressive seal to protect the interior mechanisms of hollow body 4. Since any material which reaches third sealing means 22 must have already passed through gap seal 18 and second sealing means 19, third sealing means 22 is designed to filter out materials of a relatively fine size grain. Third sealing means 22 preferably comprises a pair of sealing rotatable flocked washers 23. One of the flocked washers is attached to each of first swivel head 2 and hollow body 4 such that the washers 23 are in close proximity. Opposing faces of flocked washers 23 contain fibrous material 30 that interlocks (as shown in FIG. 2) forming a seal against small diameter debris. Although the fibrous material 30 interlocks together, the bond created is such as not to significantly hinder the rotational movement of first swivel head 1.

Sealing means 17 further comprises a fourth sealing means 24 which is situated interior to third sealing means 22 and designed to restrict passage of liquid or debris which may pass through third sealing means 22. As shown in FIG. 2, fourth sealing means 24 is a radial lip seal (such as the commercially available CR #15846 seal) which is fixed to the interior of hollow body 4 and has a lip 25 biased against an abutment ring 26 mounted around swivel shaft 6. The biasing of lip 25 against ring 26 creates a further sealing means to restrict the entry of material into hollow body 4. The primary function of ring 26 is to facilitate the entry of swivel shaft 6 into hollow body 4 during the assembly stage of the swivel. However, ring 26 also provides a clean, smooth surface against which lip 25 bears to enhance the effectiveness of the seal.

Figure 3:
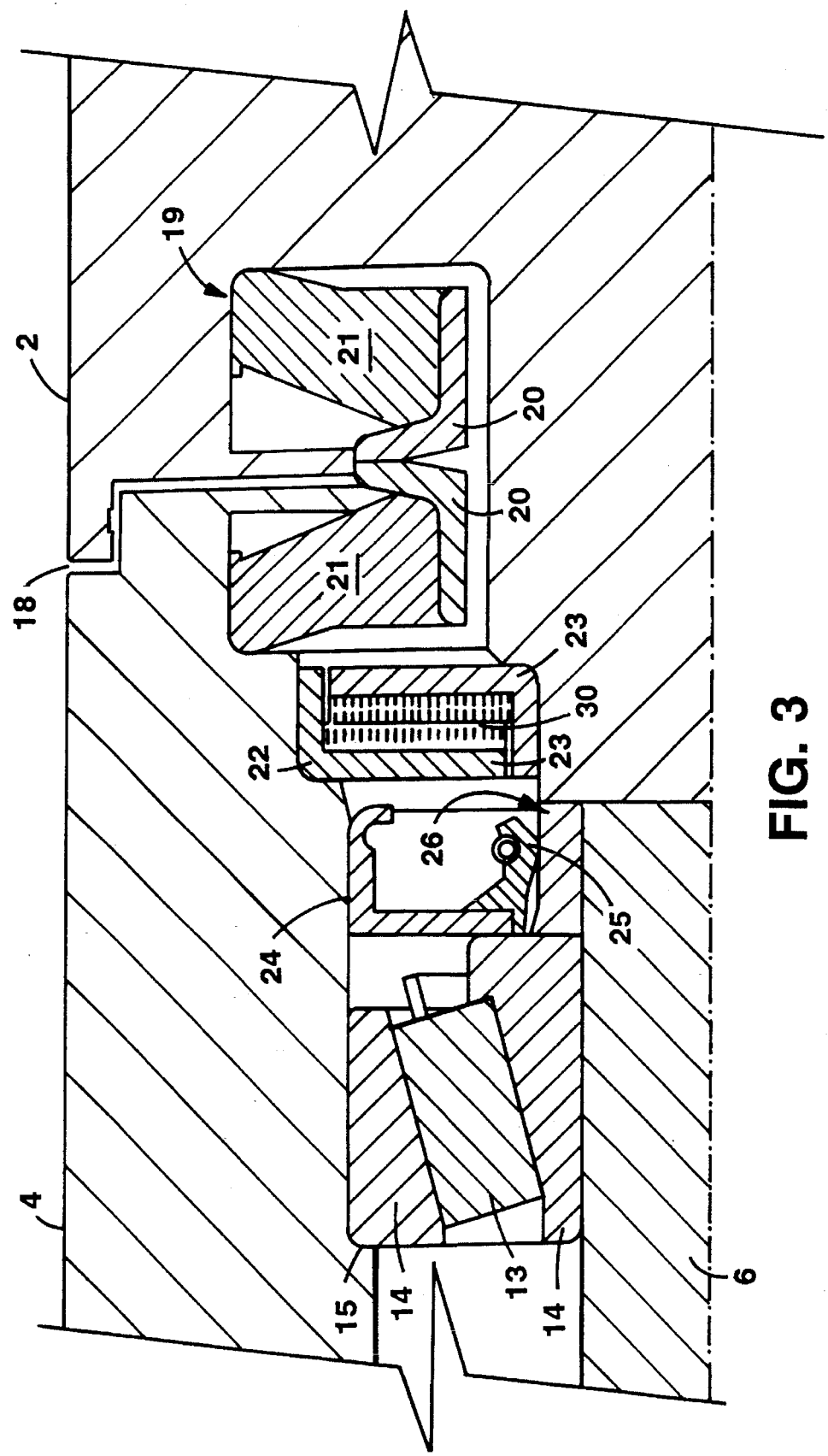
FIG. 3 is an enlarged view of the sealing means of the invention as shown in FIG. 2.

The configuration of gap seal 18, second sealing means 19, third sealing means 22, fourth sealing means 24, and their surrounding structures is more clearly shown in FIG. 3.

Swivel 1 is equipped with means 27 to flush out debris that somehow manages to penetrate sealing means 17 and enters the interior of hollow body 4. Means 27 comprises a grease fitting 28 which is threaded into swivel 1 such that it communicates directly with the interior of hollow body 4. Grease may then be injected through fitting 28 to force any debris within hollow body 4 back through sealing means 24, 22, 19, and 18 and out of swivel 1. Fitting 28 also serves as a means to introduce a lubricant into hollow body 4 to reduce the opportunity for corrosion and to lubricate bearing means 9.

As is shown in FIGS. 1 and 2, first and second swivel heads 2 and 3 are typically fitted with pulling eyes 29 to allow swivel 1 to be connected to cables or other objects, such as a clevis on a cutter used in underground boring. Pulling eyes 29 are shown as flatten portions with holes extending through them for connection to cables or the like. It will of course be appreciated by those skilled in the art that pulling eyes 29 may be of different configurations depending upon the nature of the cable or object to be connected. For example, pulling eyes 29 in an alternate embodiment could be parallel lugs with a cross bolt extending therethrough such that a looped cable may be retained. In the preferred embodiment, first and second swivel heads 2 and 3, hollow body 4 and swivel shaft 6 are constructed from a high strength, corrosion resistant metal so as to be able to withstand the forces and environments under which they may be used.

In operation swivel 1 may be connected to a pulling line, crane or lifting cable, or to an object such as a rotating cutting head in underground boring. Due to the structure of the swivel it may be used in practically any tensile loading situation where rotational movement is required or likely. Where used in a pulling situation or in underground boring, first swivel head 2 will typically be connected to the "leading end" of the pulling cable or to the rear of the cutting head. In this configuration, the overlapping of first swivel head 2 over hollow body 4 helps to assist in restricting the entry of debris into the swivel. In addition, grease fitting 28, as shown in FIG. 2, will not be as susceptible to plugging with dirt. Once first swivel head 2 is connected, the cable to be pulled or lifted may then be attached to second swivel head 3 thereby allowing the two swivel heads and their connected cables or parts to rotate independently.

Figure 4:
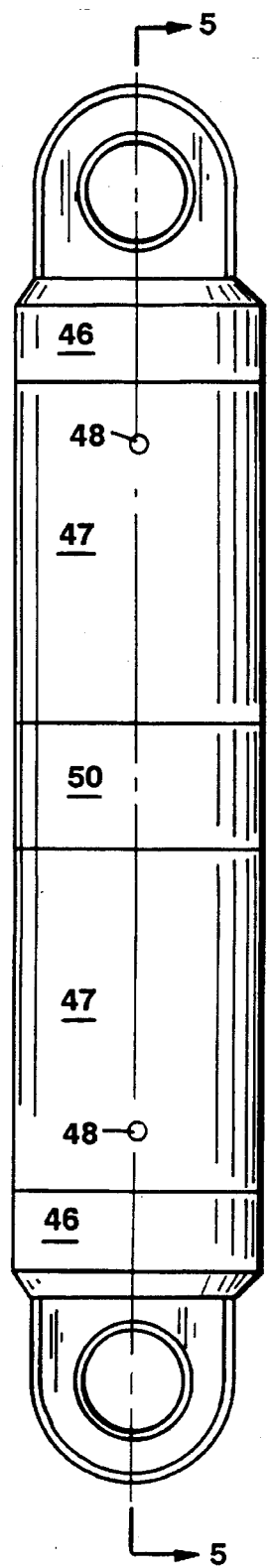
FIG. 4 is a side view of a further embodiment of the invention having swivel heads at either end of the swivel body; and, FIG. 5 is a sectional view of the swivel embodiment of FIG. 4 taken along the line 5—5.
Figure 5:
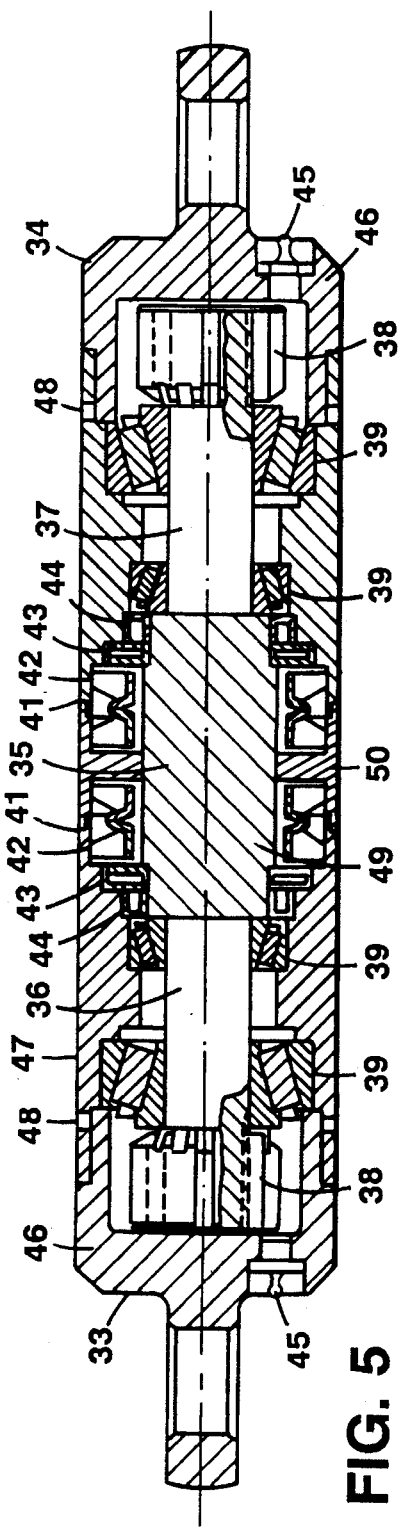

FIGS. 4 and 5 depict an alternate embodiment of the invention having independent swivel heads at each end of the swivel body. Structurally each swivel head is similar to the embodiment shown in FIGS. 2 and 3, however, reference will now be made specifically to the embodiment as shown in FIGS. 4 and 5 to more fully describe its particular structure.

As shown in FIG. 5, first and second swivel heads 33 and 34 are situated at opposite ends of swivel body 35. First and second swivel heads 33 and 34 encompass swivel shafts 36 and 37, which are attached to opposite ends of swivel body 35, such that swivel heads 33 and 34 are able to rotate about swivel shafts 36 and 37. Retaining means 38 secure swivel heads 33 and 34 about swivel shafts 36 and 37 while bearing means 39, situated between the swivel shafts and the swivel heads, allow for reduced frictional rotation.

To prevent the entry of dirt and other debris into the swivel, a plurality of sealing means are incorporated into the structure. The sealing means are generally noted as 40 and are progressively more restrictive to the passage of particulate and liquid debris into the swivel.

As is apparent from FIG. 5, retaining means 38 and bearing means 39 are the same locking nut and tapered roller bearing structure as described with respect to the embodiment shown in FIG. 2; the primary difference being that each of swivel heads 33 and 34 utilize such retaining and bearing means. Furthermore, it will also be apparent that sealing means 40 comprises first, second, third, and fourth seals 41, 42, 43, and 44, respectively, which are generally the same in both structure and function as the seals 18, 19, 22 and 24 shown in FIGS. 2 and 3. As shown in FIG. 5, seals 44, being radial lip seals as indicated at 24 in FIG. 2, typically bear against swivel body 35, however, it will be appreciated that seals 44 could also be configured to bear directly against swivel shafts 36 and 37, or against an abutment ring as shown at 26 in FIG. 2.

Each of first and second swivel heads 33 and 34 are equipped with grease fittings 45. As in the embodiment of FIG. 2, grease may be injected into fittings 45 to force debris within the swivel out through sealing means 44, 43, 42, and 41, and eventually out of the swivel. The injected grease will also serve to lubricate the swivel and reduce the opportunity for internal corrosion. Accordingly, the unique design and placement of the sealing means 40 and the grease fitting 45 together provide the dual function of cleaning and lubricating the swivel.

FIG. 5 also shows that swivel heads 33 and 34 are comprised of an outer head portion 46 and an inner collar 47. Outer head portion 46 and inner collar are typically screwed together and are prevented from becoming detached through the aid of a set screw 48. Swivel heads 33 and 34, being constructed of these two main components, enable easy access to the interior of the swivel for assembly and maintenance. Furthermore, as shown in FIG. 5 swivel heads 33 and 34 are identical in structure and configuration. As a result, should one swivel head become damaged or sufficiently worn such that it no longer functions efficiently, it may be removed from the swivel and replaced with a new or re-built head.

In addition, the swivel body 35 is also constructed of two major components; namely a solid inner core 49 and a circular medial ring 50. The inner core 49 serves as a base to which swivel shafts 36 and 37 are secured and also provides a central body about which each of swivel heads 33 and 34 may rotate. Circular medial ring 50 is fixed to inner core 49 and provides a surface for overlapping swivel heads 33 and 34 to form first gap seals 41. Swivel heads 33 and 34 also rotate about medial ring 50. In addition, medial ring 50 serves as an external means of inspection to ensure that both swivel heads 33 and 34 are rotating independantly about the swivel shafts. That is, without medial ring 50 there would be no common reference point from which the rotation of each swivel head may be checked to ensure that it is still functioning properly.

As discussed, and as will be apparent from FIGS. 4 and 5, the embodiment shown provides a means for independent rotation of objects connected to the ends of the swivel even if one of the swivel heads 33 or 34 should for some reason fail and cease rotation.

It is to be understood that what has been described are the preferred embodiments of the invention and that it is possible to make variations to these embodiments while staying within the broad scope of the invention. Some of these variations have been discussed while others will be readily apparent to those skilled in the art to which the invention relates. For example, while reference has been made to abutment ring 26 upon which lip 25 bears, lip 25 could equally bear directly against swivel shaft 6. In addition, while the use of pulling eyes 29 on the ends of the swivel are discussed, it will be apparent that clevises or other means of connecting the swivel to various objects could equally be used. Furthermore, in the swivel embodiment shown in FIGS. 4 and 5, the swivel shafts and swivel body are shown as individual parts whereas they could equally be of unitary construction.

The embodiments of the invention in which an exclusive property or privilege is claimed are defined as follows:

1. A harsh environment line swivel comprising:

(a) first and second swivel heads situated at opposite ends of a swivel body, said first and second swivel heads in rotational engagement with said swivel body;

(b) a pair of swivel shafts attached to said swivel body, said swivel shafts being received within said first and said second swivel heads, respectively;

(c) retaining means securing said swivel shafts within said swivel heads, said retaining means permitting rotational movement of said swivel heads about said swivel shafts and said swivel body;

(d) bearing means for reduced frictional rotation of said swivel heads about said swivel shafts; and, (e) a plurality of sealing means between said swivel heads and said swivel body, said sealing means progressively more restrictive to the passage of particulate and liquid debris into said swivel body and said swivel heads.

2. A line swivel as claimed in claim 1 wherein said bearing means comprises first and second sets of tapered roller bearings between said swivel heads and said swivel shafts, said tapered roller bearings situated interior to said sealing means.

3. A line swivel as claimed in claim 2 including means to flush debris from the interior of said swivel.

4. A line swivel as claimed in claim 3 wherein said sealing means includes first, second, third, and fourth seals, arranged in series, and providing a progressive sealing function to prevent the passage of debris into the interior of said swivel.

5. A line swivel as claimed in claim 4 wherein said first seal comprises a gap seal between the outer surface of said swivel heads and said swivel body, said second seal comprises opposing contacting ring members bearing against one another in frictional rotational contact, said third seal comprises opposing rotatable flocked washers, and said fourth seal comprises a radial lip seal.

6. A line swivel as claimed in claim 5 wherein said means to flush debris from said swivel comprises grease fittings situated in said swivel heads to allow for the injection of grease into said swivel heads to flush debris back through said sealing means and out of said swivel.

7. A line swivel as claimed in claim 6 wherein said retaining means comprises locking nuts threaded onto the ends of said swivel shafts, said locking nuts being tightened against one set of said tapered roller bearings and also serving to prevent axial movement of said roller bearings on said swivel shafts.

8. A line swivel as claimed in claims 1, 5 or 7 further comprising external means to inspect whether each of said first and second swivel heads rotate freely and independantly about said swivel shafts.

9. A swivel as claimed in claims 1 or 7 wherein said first and said second swivel heads have pulling eyes to allow connection of said swivel to other objects.

10. A swivel as claimed in claims 1 or 7 wherein said first and said second swivel heads, said swivel body and said swivel shafts are comprised of a high strength, corrosion resistant metal.

\* \* \* \* \*